United States Patent
Hore

(10) Patent No.: US 9,825,925 B2
(45) Date of Patent: Nov. 21, 2017

(54) METHOD AND APPARATUS FOR SECURING SENSITIVE DATA IN A CLOUD STORAGE SYSTEM

(71) Applicant: Bijit Hore, Riverside, CA (US)

(72) Inventor: Bijit Hore, Riverside, CA (US)

(*) Notice: Subject to any disclaimer, the term of this patent is extended or adjusted under 35 U.S.C. 154(b) by 142 days.

(21) Appl. No.: 14/737,477

(22) Filed: Jun. 11, 2015

(65) Prior Publication Data

US 2015/0365385 A1 Dec. 17, 2015

Related U.S. Application Data

(60) Provisional application No. 62/010,665, filed on Jun. 11, 2014, provisional application No. 62/174,390, filed on Jun. 11, 2015.

(51) Int. Cl.
*H04L 29/06* (2006.01)

(52) U.S. Cl.
CPC .......... *H04L 63/06* (2013.01); *H04L 63/0428* (2013.01)

(58) Field of Classification Search
CPC ......... G06F 17/30864; G06F 17/30554; G06F 17/30011; G06F 17/30613; G06F 17/212; G06F 17/30796; G06F 17/30902; H04L 63/06; H04L 63/0428
See application file for complete search history.

(56) References Cited

U.S. PATENT DOCUMENTS

| | | | | |
|---|---|---|---|---|
| 8,949,371 B1* | 2/2015 | Shrowty | ............. | G06F 21/6218 709/217 |
| 2005/0038866 A1* | 2/2005 | Noguchi | ........... | G06F 17/30864 709/217 |
| 2008/0244429 A1* | 10/2008 | Stading | ............. | G06F 17/30554 715/764 |
| 2008/0263363 A1* | 10/2008 | Jueneman | ............... | G06F 21/32 713/184 |
| 2012/0084287 A1* | 4/2012 | Lakshminarayan | | G06F 17/30536 707/737 |
| 2014/0025684 A1* | 1/2014 | Hess | ................. | G06F 17/30699 707/741 |
| 2015/0135300 A1* | 5/2015 | Ford | ................... | H04L 67/1097 726/11 |
| 2015/0244684 A1* | 8/2015 | Ng | ......................... | H04L 67/10 713/168 |

* cited by examiner

*Primary Examiner* — Tri Tran

(57) ABSTRACT

In one aspect, relates to a system and method of seamlessly encrypting data files before uploading them to a public cloud storage system by providing an encrypted drive system (EDS) that forms a security layer around existing cloud storage services to provide enhanced protection to data. The EDS also provides a convenient interface to specify data protection policies across connected cloud storage applications. The EDS implements standard functionalities like accessing, search and sharing directly on the encrypted data using secure indexing and querying of encrypted data. The EDS is able to guarantee a much higher level of security for data in the cloud without the user having to compromise on the features of the various applications.

17 Claims, 15 Drawing Sheets

METHOD AND APPARATUS FOR SECURING SENSITIVE DATA IN A CLOUD STORAGE SYSTEM

CROSS-REFERENCE TO RELATED APPLICATIONS

This application is a claims priority from U.S. Provisional Application No. 62/174,390, titled METHOD AND APPARATUS FOR SECURING SENSITIVE DATA IN A CLOUD STORAGE SYSTEM and filed 11 Jun. 2015. This application is hereby incorporated by reference in its entirety. This application is a claims priority from U.S. Provisional Application No. 62/010,665, and filed 11 Jun. 2014. This application is hereby incorporated by reference in its entirety.

BACKGROUND

1. Field

The present invention relates generally to data encryption and, more particularly, to a system and method of seamlessly encrypting data files before uploading them to a public cloud storage system, while still maintain the ability to search, access, manipulate and share the data files.

2. Related Art

With the proliferation of mobile computing, virtual offices and a general "computing on the go" culture, usage of cloud-based content management services like Box Drive®, DropBox®, Google Drive® etc., has grown tremendously in recent years. The various online productivity features that may use no software installations, along with the "easy sharing" and "access from anywhere" nature of cloud applications are driving up the use of these cloud-based content management applications within enterprises. As a result, vast amounts of corporate data are migrating to these services in the cloud. However, one pertinent issue that is a growing concern is that of privacy (and security) of data residing in the cloud. Data privacy and security regularly ranks amongst the top concerns for businesses, especially if the business is in a regulated industry and/or makes significant innovations and has a lot of sensitive and proprietary information to manage.

In spite of these concerns for data security, there is a surprising lack of support for enforcing data privacy in cloud-based content management applications across the board. The owner has to practically hand over his/her data to the service provider in order to get any meaningful service. Traditional data storage systems have acknowledged the need for greater security for data from malicious entities, and as a result, have implemented a variety of measures for securing data at rest—from relational database management systems (RDIMS), network attached storage (NAS) appliances, tape drives to PC hard drives, vendors today support granular data encryption. They have also integrated suitable frameworks for encryption-key management and policy-based access control. However, when the database administrators themselves are not trusted by data owners (as is the case for public-cloud platforms), some other mechanism for data encryption is required that protects the data without affecting its usability in the cloud.

SUMMARY OF INVENTION

The object of the present invention is to provide a system and method for user of public cloud stores by providing an advanced data security framework to protect sensitive documents and files stored in the cloud from external or internal attacks by keeping it encrypted (or obfuscated) at all times i.e., in storage, in motion and while in use. The system and method for securing sensitive data in a cloud storage system comprises a middleware, Encrypted Drive System (EDS) application that adds a "functional security layer" around the data stored within a public cloud application.

In an exemplary embodiment, a user, who by linking their public cloud storage accounts to the EDS, will be able to encrypt their files before uploading them to the cloud (i.e., the linked storage services like Google Drive®, Drop Box® etc.). However, the user can continue to access all of the existing features of the cloud service, such as accessing it from multiple devices, search and find files using keyword queries, sharing documents with co-workers, etc. without decrypting the files and exposing its contents to the cloud service. It provides the same set of features as the user's regular access to their cloud application. However, EDS offers a significantly higher level of security since it transforms the sensitive data using strong (AES-256) encryption. Even if the user's cloud account is compromised, the sensitive files will be protected as they are encrypted and the encryption keys are stored securely at a separate location (selected by the user from multiple options provided by EDS).

Thus, EDS gives user all the controls to decide how, when and where their data is stored, accessed, shared and exposed (to the service provider) in the cloud. Further EDS protects data from the server side adversaries like snoopers (e.g., a malicious system administrator), external hackers (who may get access to a cloud account illegally by phishing or social hacking), third-party malicious services/applications (malicious applications can leak information or run inference algorithms covertly to glean sensitive information from data).

The above features as well as additional features and aspects of the present invention are disclosed herein and will become apparent from the following description of preferred embodiments of the present invention.

Figure 1:
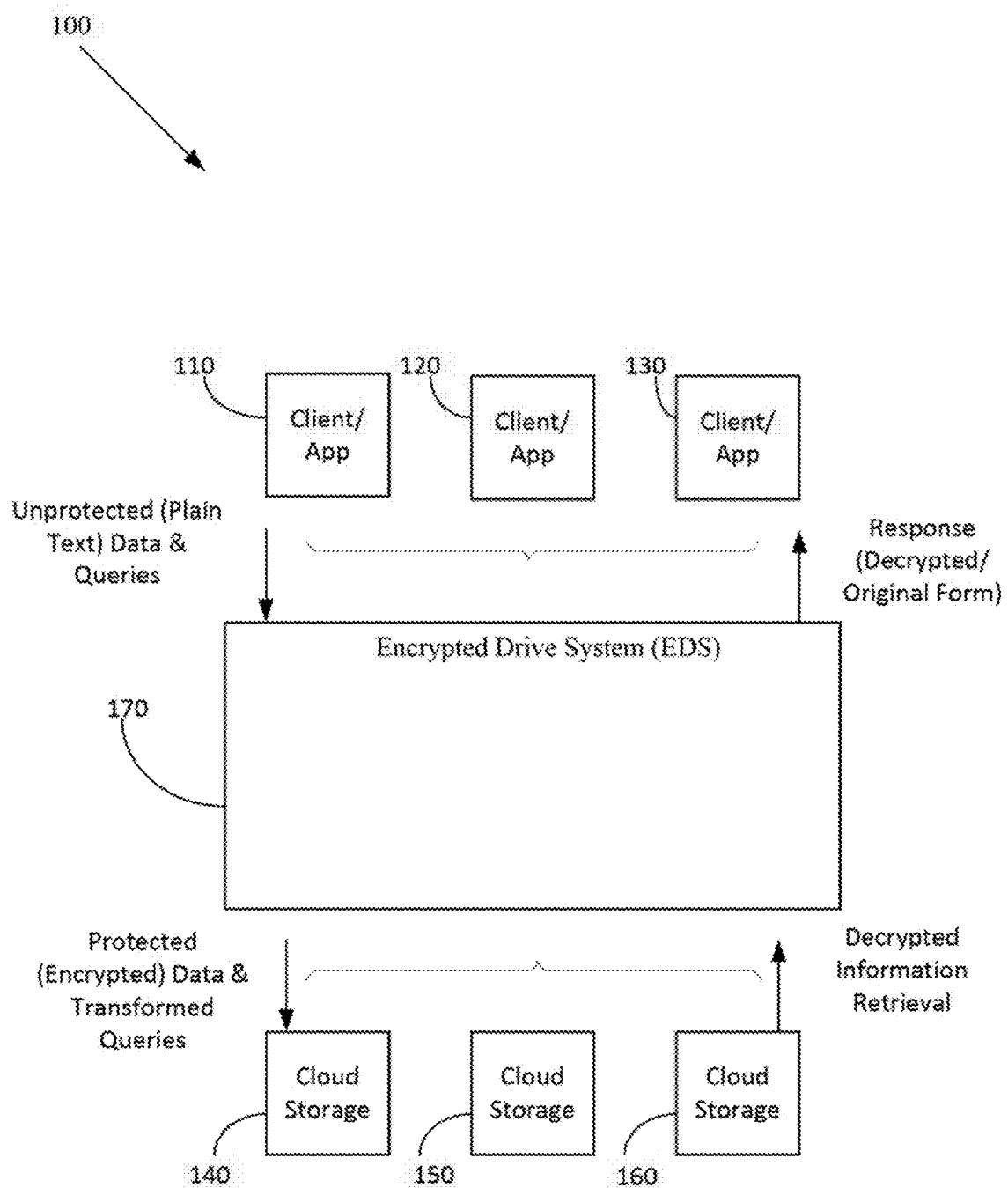
FIG. 1 illustrates securing sensitive data in the cloud storage system, according to some embodiments.

The Figures described above are a representative set, and are not an exhaustive with respect to embodying the invention.

DETAILED DESCRIPTION

Disclosed are a system, method, and article of manufacture of seamlessly encrypting data files before uploading them to a public cloud storage system, while still maintain the ability to search, access, manipulate and share the data files. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

EXAMPLE DEFINITIONS AND EXAMPLE ALGORITHMS

Bloom Filter can be defined by two (2) positive integers 'n' and 'm', where n is typically much larger than m (n>>m) just as in the previous coloring algorithm. The Bloom Filter is initiated with a bit-array B of size n, with all bit-positions set to 0. Also, there are m hash functions $h\__1( ) \ldots h\_m( )$ that are fixed in the beginning. Each hash function maps an input element (e.g., the string 'computer') to a bit-position between 1 and n. To note the presence of element 'e' (in the set represented by the Bloom Filter), the insertion algorithm computes the bit-positions $h\__1(e), h\__2(e), \ldots, h\_m(e)$ and sets those bit-positions to 1 in B. This is done for every element of the set being represented by the Bloom Filter. Now, to check the presence of an element 'x', check the bit positions $B[h\__1(x)], B[h\__2(x)], \ldots, B[h\_m(x)]$ and if all of them are 1, then it is assumed that element x is present in the set. Note that this process can generate false-positives (i.e., falsely concluding that an element is present in the set when it is not), but will never generate false-negatives, i.e., never say that an element is absent when it is present in reality. For appropriately chosen values of m and n, the rate of false-positives can almost be made negligible, i.e., probability of a false-positive can be made very close to 0.

The following is an example of a Bloom Filter. In one case, a document is seen as a 'set of strings' (i.e., set of keywords) and therefore can be represented using a Bloom Filter data structure. For example, Bloom Filter parameters can be set to n=10000 and m=10 for all documents. Then, for each string 's' (keyword) in a document, the bit-positions can be set as $B[h\__1(s)], B[h\__2(s)], \ldots, B[h\_{10}(s)]$ of its corresponding Bloom Filter bit array to 1. Multiple independent Bloom Filters per document can be stored (initialized potentially with different values for parameters n and m and different set of hash functions).

Platform as a Service (PaaS) can be a category of cloud computing services that provides a platform allowing entities to develop, run and manage Web applications without the complexity of building and maintaining the infrastructure typically associated with developing and launching an application.

Pattern Detection: for pattern-matching queries, the present embodiments can support a subset of regular expressions (http://en.wikipedia.org/wiki/Regular_expression) where a pattern is specified as a string of characters chosen from the set of alphanumeric characters and these symbols: '*', '_', '%'. The symbol '*' denotes any number of repetition of a pattern, such as the pattern '(ab)*' matches the empty string and all strings of the form ab, abab, ababab, . . . . The symbol '_' matches any single character. So, the pattern 'ab_c' will match strings like abac. abbc, abcc, abdc, abec, . . . ab1c, ab2c, . . . . Finally, '%' stands for 'any string'—example: 'ab%cd' will match strings abcd, abacd, abaaaacd, ab234dfcd, i.e., all strings starting with 'ab' and ending in 'cd'. Multiple of these symbols can be combined in a pattern expression, for example, '(ab)*cd_', (ab)*(cd)*_xy_' are all valid patterns that can be issued as queries.

RSA (Rivest-Shamir-Adleman) cryptosystem can be a cryptosystem for public-key encryption. The encryption key can be public and differs from the decryption key which is kept secret. This asymmetry can be based on the practical difficulty of factoring the product of two large prime numbers, the factoring problem.

REFERENCE NUMERALS

Please refer the following reference numerals for the figures discussed herein.
Client/app (110,120,130).
Encrypted drive system (170), (360) and (510).
Cloud storage (140,150,160), (210,220,230) and (310, 320,330).
Encryption key store (In cloud) (240) and (340).
Encrypted files (270) and (390).
Metadata (272), (385) and (380).
Key manager (252).
Encryption/decryption (254).
Plain text files (262).
EDS client (260) and (514).
Documents (410).
Cloud document store (470).
Document parsing (420).
Document coloring based on word set (w) and pattern set (p) (430).
Content summary generation (440).
Key generation and document encryption (450).
Document upload and key persistence (460).
Key-value store (472).
Query (512).
Matching results (540).
EDS server (510).
Translated query (522).
Metadata and web-links (534).
Storage of documents (532).
Evaluations of translated query, returns metadata and web links of matching documents (530).

EXAMPLE METHODS AND SYSTEMS

Embodiments described herein include an encrypted drive system (EDS) that provides security layer around existing cloud storage services to provide enhanced protection to data and a key store located separately from the EDS for securely storing keys used to encrypt documents by the EDS. The EDS provides a convenient interface to specify data protection policies across connected cloud storage applications. The EDS implements standard functionalities like accessing, search and sharing directly on the encrypted data using secure indexing and querying of encrypted data. By aggregating multiple cloud services in an interface, the EDS extend the capabilities of some of the services. For instance, the EDS may search over encrypted file contents stored across the services even though some of them do not provide it natively. The EDS can run on a typical web-server or on a "Platform as a Service (PaaS)" cloud such as the Google app engine (GAE) or Amazon Web Services (AWS) platform. An embodiment can use GAE as the platform of choice to illustrate all interactions of the EDS with the underlying PaaS cloud. GAE provides functionalities that typical web application servers do and more. Some of the services it provides can be, inter alia:
Persistent storage with queries, sorting, and transactions.
Automatic scaling and load balancing.
Asynchronous task queues for performing work outside the scope of a request.
Scheduled tasks for triggering events at specified times or regular intervals.

Integration with other Cloud Services and APIs.

Various examples of user flow for EDS are now provided. According to some embodiments, in order to use the EDS system, the user navigates to the main EDS webpage and logs into the system. In one instantiation of the EDS, the login flow is tied up to the Google authentication and login process. So, the user can see a standard Google login page and can sign-in using any of his Google account credentials (user-name+password). The first time when user signs-in, the EDS asks for permission to access files in user cloud drive accounts.

Referring to FIG. 1, once the authorizations are given, the EDS account 170 of the user is automatically taken to the EDS 170 main web interface. From the main EDS UI, the user can browse users third party account 140, 150 160 and folders and other standard operations like uploading, searching and sharing files with others etc. The operations that are available to the user from this interface are (i) An user can pre-encrypt and upload files from his machine to his cloud drives, (ii) User/administrators can set restrictions on encrypted files ('prevent sharing', 'prevent decryption', 'prevent download', 'prevent printing' etc.), (iii) Search over encrypted documents, (iv) Encrypt and share files with other users of EDS 170 such that the files never have to be decrypted for sharing purposes, (v) EDS 170 provide users with a secure way to collaboratively edit documents online and encrypt them for archival purposes, (vi) Set policies for automatic enforcement of security rules, (vii) Allow creation of shared folders where data always remains encrypted and (viii) Creators can add other security rules to the folders.

Typically, there are at least two possible deployments of EDS 170. The first deployment is from a resource-constrained environment as that involving an individual user (consumers). The second deployment is a hybrid model, such as in a corporate setting where an employee might be logged into EDS from within a corporate network with some components of the EDS (170) running on a dedicated server within the company's network.

Figure 2:
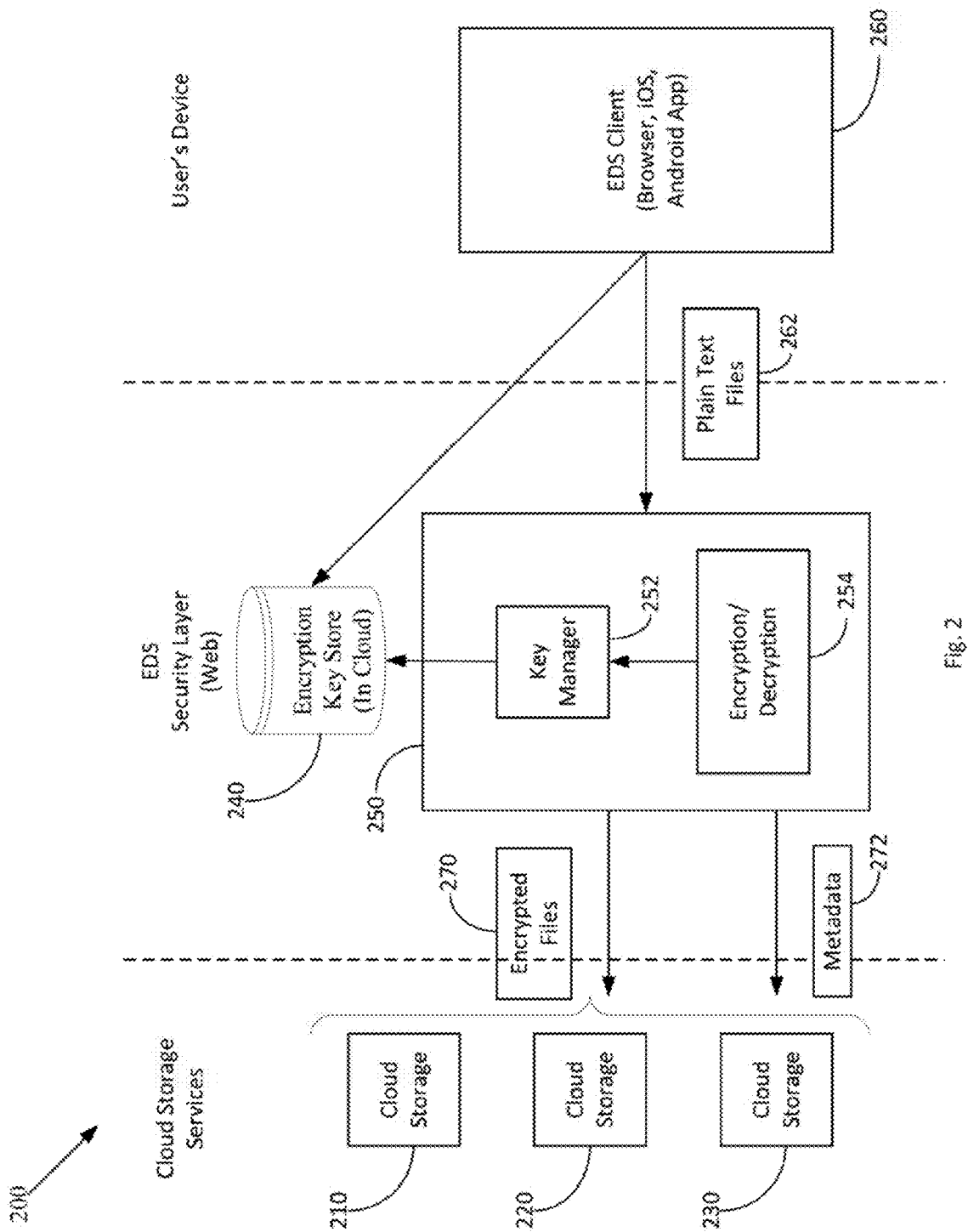
FIG. 2 illustrates how a user may access EDS on their personal computing device, according to some embodiments.

Referring to FIG. 2 is a block diagram 200 illustrating how an individual consumer may access EDS on their personal computing device according to an embodiment. In FIG. 2, cloud storage services 210, 220, 230 are coupled to EDS 250. The EDS 250 includes a key manager module 252 and an encryption/decryption module 254. Keys are stored in key store 240. Users interface with EDS 250 through EDS clients 260. EDS 250 sends encrypted files 270 and metadata 272 that are based on the plain text files 262 provided to EDS 250 by the EDS client 260. The EDS 250 is also responsible for data annotation, query translation (for execution on encrypted data) and for retrieving and processing response from the cloud services 210,220,230. EDS 250 also implement encryption key 240 sharing between users to facilitate protected-documents sharing and policy-based data encryption.

Figure 3:
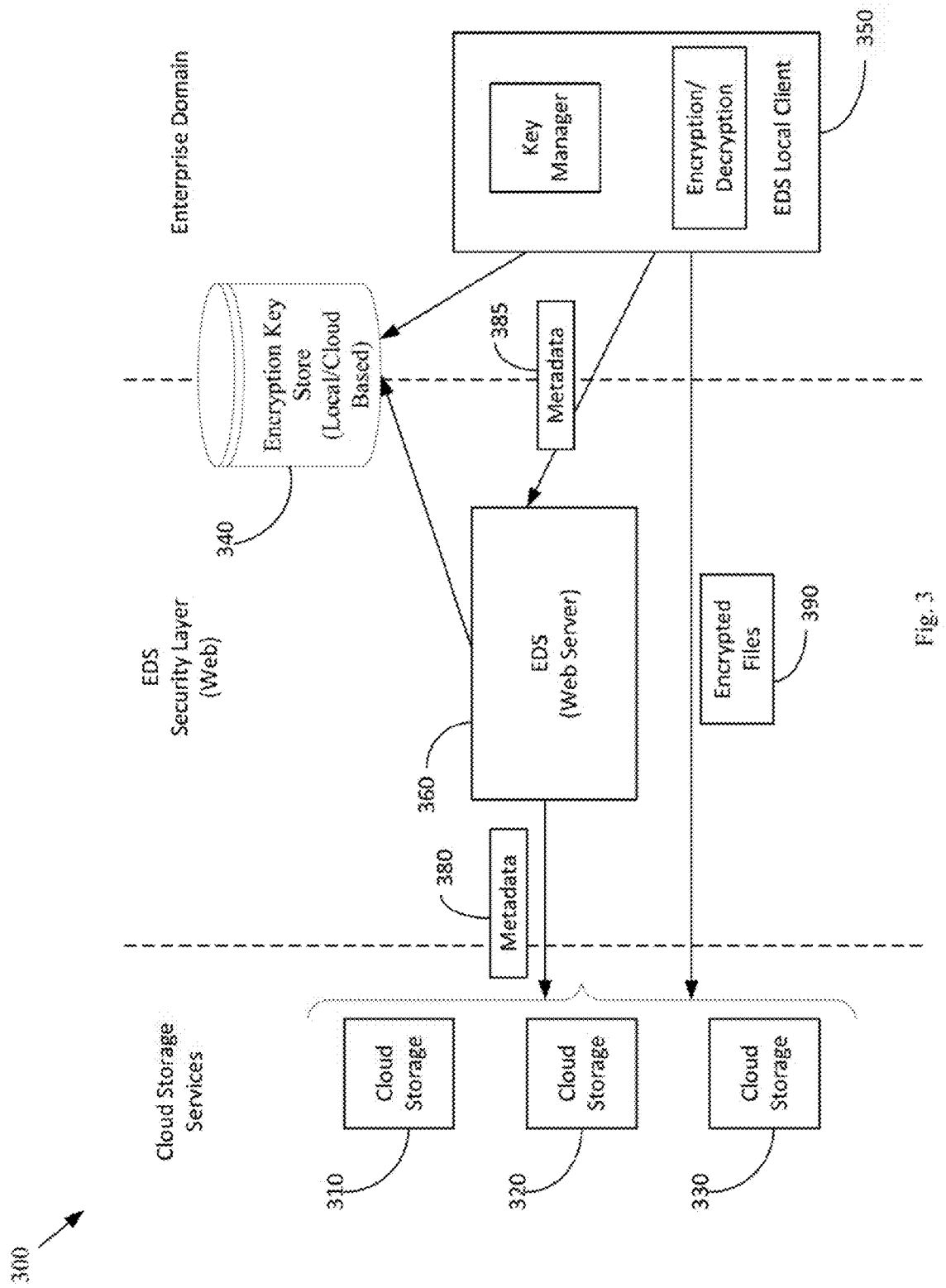
FIG. 3 shows components of an EDS application that is executed in a client and deployed within an enterprise's internal network, according to some embodiments.

Referring to FIG. 3 shows components of an EDS 360 that run in a client and deployed within an enterprise's internal network according to an embodiment. In particular, the encryption/decryption module 350 and encryption key management module 340 may be wholly implemented within this client for maximum security. Also, the encryption key store 340 may optionally be running on a server within the enterprise's private network instead of the cloud. The EDS 350 allows the user to access their files, e.g., metadata 380 and encrypted files 390, stored in the third-party cloud storage services 310,320,330. The EDS local client 350 may encrypt documents and provide metadata 385 to the EDS in the cloud Several operations have the user to input his secret passphrase. For instance, decrypting the file, sharing an encrypted file would request user to input his passphrase. Alternately, it can be saved as a session variable by the server, which won't have the user to input it for each such interaction during a single session. Logging out of the application ends the user-session and returns him to the initial login page.

Figure 4:
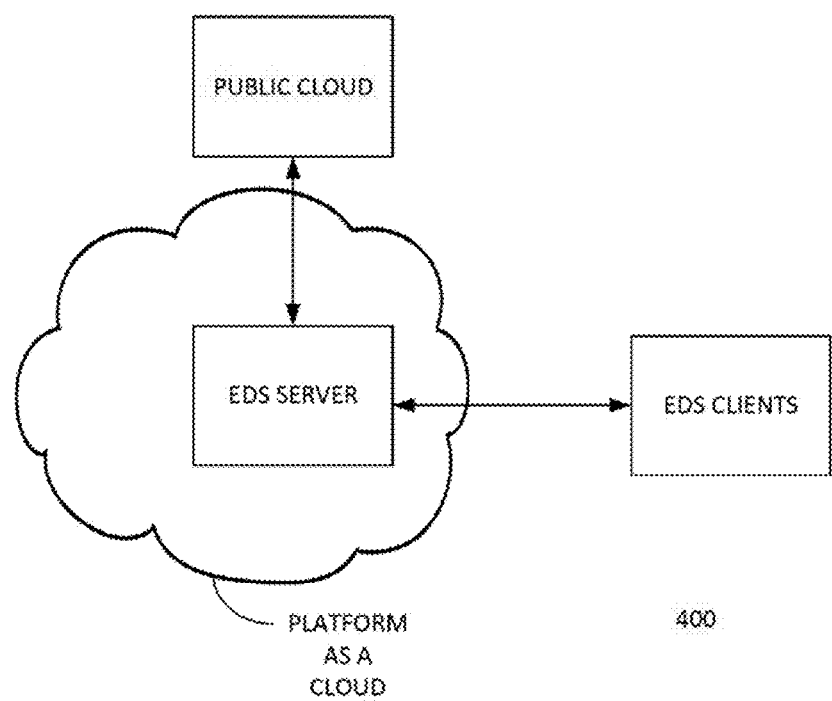
FIG. 4 general representation of EDS system, according to some embodiments.

Referring to FIG. 4 and system 400, Users interact via a web, mobile or desktop client via https messages with the EDS web server. For example, the EDS web client is written in JavaScript, uses AJAX based design for the user interface and HTTP-based messages to interact with the server. The https message makes a call to an appropriate server-side function exposed via a RESTful API. The function is evaluated and the response is sent back to the client over the same channel in a suitable JSON format. Mobile clients will be developed for iOS and Android devices which will interact with EDS server via the same RESTful APIs.

Figure 5:
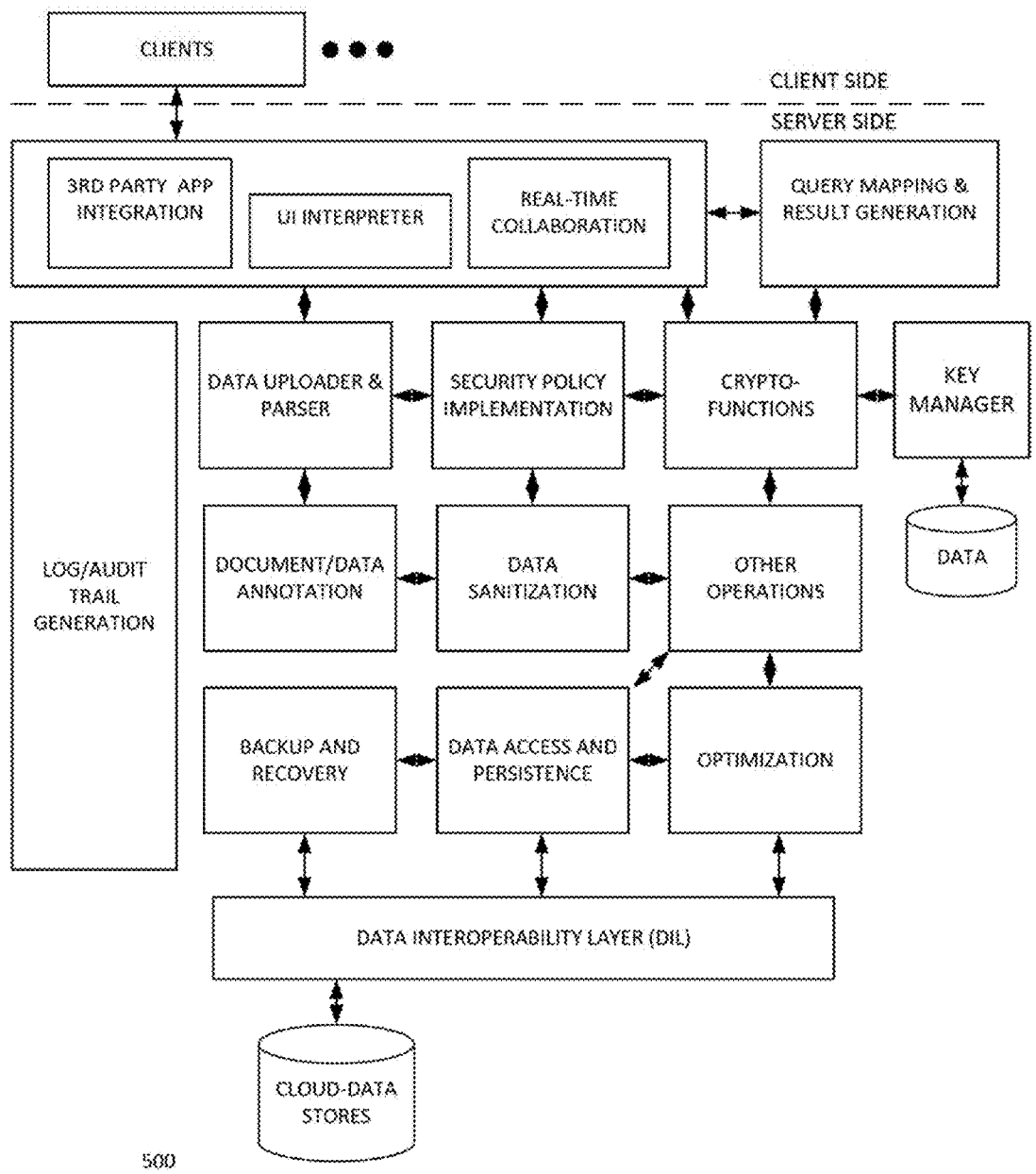
FIG. 5 shows the functional module in the EDS system, according to some embodiments.

Example embodiments of EDS functional modules are now provided in FIG. 5 and system 500. The following provides the brief description of module of the EDS system. The cloud data store module enables the system to interact (read and write files and metadata) into various cloud stores like Google Drive, Dropbox and Box integration.

Data Interoperability Layer (DIL) module implements an abstraction layer that makes it easy to read and write files and metadata into the various cloud stores. Other modules of system use functions provided by the DIL layer to enable reading/writing of files from/into any one of the connected cloud stores. DIL performs various compatibility checks when writing files into the different back ends. While most file contents can be moved easily from one store to another, file metadata formats might not be compatible. For instance, when moving a file from cloud-store A to cloud-store B, it maps the metadata fields (schema) appropriately from the source to target cloud to ensure no metadata is lost or corrupted in the migration process.

Data Access and Persistence module's (DAP) Primary function is to read/write all kinds of files from/into target cloud stores. Generation of appropriate file metadata and book-keeping (updating indices) etc. are also performed by this module.

Data Caching and Server-side Optimizations (DCSO) module is responsible for data-caching and other server-side optimizations for operations involving large files. Some long-running or background processes might use fast access to file data. For such operations file content and/or metadata may be cached for limited duration on the system server. Additionally, variety of auxiliary data can also be cached on the system server during an active session depending on users' data access patterns etc.

Backup and Recovery (BnR) module is responsible for backing up and recovering files and associated data. Critical data like encryption keys are automatically backed up to a redundant storage whenever they are created or updated. If such data is lost or corrupted in the primary storage, recovery is done seamlessly with minimal effect on application performance. Additionally, backup and recovery functionality for files and folder in users' linked cloud stores will be provided by this module.

Cryptographic Operations module (CrO) implements the standard cryptographic operations such as encryption/decryption of data, documents, metadata and keys, cryptographic signatures, digest-generation, hashing, salting etc. It also communicates with the encryption-key management module to read/write encryption keys.

Other operations on encrypted data (OP) module implements auxiliary functionality utilized for scalable management of encrypted documents. There may be limits placed on resource utilization by applications deployed on multi-tenant PaaS clouds. This module is responsible for implementing these cryptographic operations in a robust manner on such clouds. For instance, since encryption of large files can add significant computation overhead, the OP module may decide to offload the encryption operation of large files to a separate dedicated server depending upon its size so as to keep the load on the application server within stipulated limits. In an alternate approach, it might decide to break up a large file into multiple chunks and encrypt them separately. This can use some book-keeping to ensure that files remain decryptable nonetheless.

Security Policy module (SP) implements functionality to support creation and implementation of user-defined security policies. It lets data owners and administrators define various access-control and data encryption rules. Typical rules are specified in the 'IF <condition> THEN <action>' format. Upon triggering events, the policy manager checks if the <condition> for a security rule and if true, then the corresponding <action> is enforced. When there are a large number of rules and files the SP module may employ various optimizations and implement specialized data structures to enable fast execution of rule condition checking and action enforcement.

Data Uploader and Parser (DUP) module handles functions related to file upload operation from user's machine. It is responsible for reliable upload and download of large files. It keeps track of intermediate state of upload. For example, if the upload of a large file is broken, it can be resumed in case connection drops in between etc. The DUP module also carries out the parsing of all kinds of files. The parser typically extracts keywords and patterns present in the file and makes these available to the security policy and document indexing/annotation modules.

Document indexing and metadata generation module (DIM) is responsible for generating the "indexable tags" stored as metadata along with encrypted documents. Even though the encrypted content itself is not searchable, the metadata tags corresponding to a document (generated by our algorithms) are indexable and searchable. These tags allow system to execute full-text keyword search queries over the collection of encrypted documents.

Data sanitization (DS) module is responsible for a variety of "data sanitization" features that the system provides. Data sanitization refers to a broad class of data (document) transformation (masking) tasks. For instance, a user may want to share with his tax consultant a set of mortgage documents. However, he wants to mask out certain portions of the document that contain sensitive information before sharing with the consultant. The DS module in the system will provide functionality to carry out such maskings. Other forms of data transformation, such as "tokenization", "value generalization" or "perturbation" will also be provided by the DS module.

Query mapping and result generation (QnR) module implements functions to implement the "search over encrypted documents" feature in the system. It does two primary tasks (i) transform user (plaintext) search queries into a form that can be issued to the cloud service which can only access the metadata. And (ii) Process the query response returned from the server before sending back the final results to the client.

Key management (KM) module is the cryptographic key management module. It is responsible for all tasks related to cryptographic key management such as generation of public-private key pairs, AES-256 key generation, key material persistence, backup and recovery operations etc. This module is also responsible for integrating with users' existing cryptographic key servers which might be deployed on-prem.

Encryption keystore (KS): The KS is either located in the cloud or on prem. The system provides integration only with a keystore located in the cloud which it manages for all clients. Log and audit trail generation (LAT) module is responsible for log and audit trail generation for all activities by users of EDS system. Logs and audit-trails are both important for administrative purposes in enterprise accounts and also for recovery in case of data loss events. Client interaction module contains three distinct modules that include User Interface module (UI interpreter), Real-time (RT) collaboration module and the 3rd party app integration framework (AIF).

User interpreter (UI) module is the primary server-side module in charge of interacting to different kinds of clients such as web, mobile, desktop etc. This module exposes the server-side functionalities as a RESTful interface. Data is typically exchanged in JSON format with clients. Real-time (RT) module implements real-time secure collaboration features in the system. This includes features like secure real-time collaborative viewing and editing of documents and spreadsheets. App integration framework (AIF) module provides a control mechanism to selectively and minimally open up protected (sensitive) data to 3rd party apps.

Client modules which are primarily of the following 3 types: Mobile (Mc), Desktop (Dc), Web (Wc). These modules run on user-devices and interact with the system server primarily using a RESTful API exposed via the client interaction module on the EDSserver. Various interface details will be described in the following sections of the document.

Figure 6:
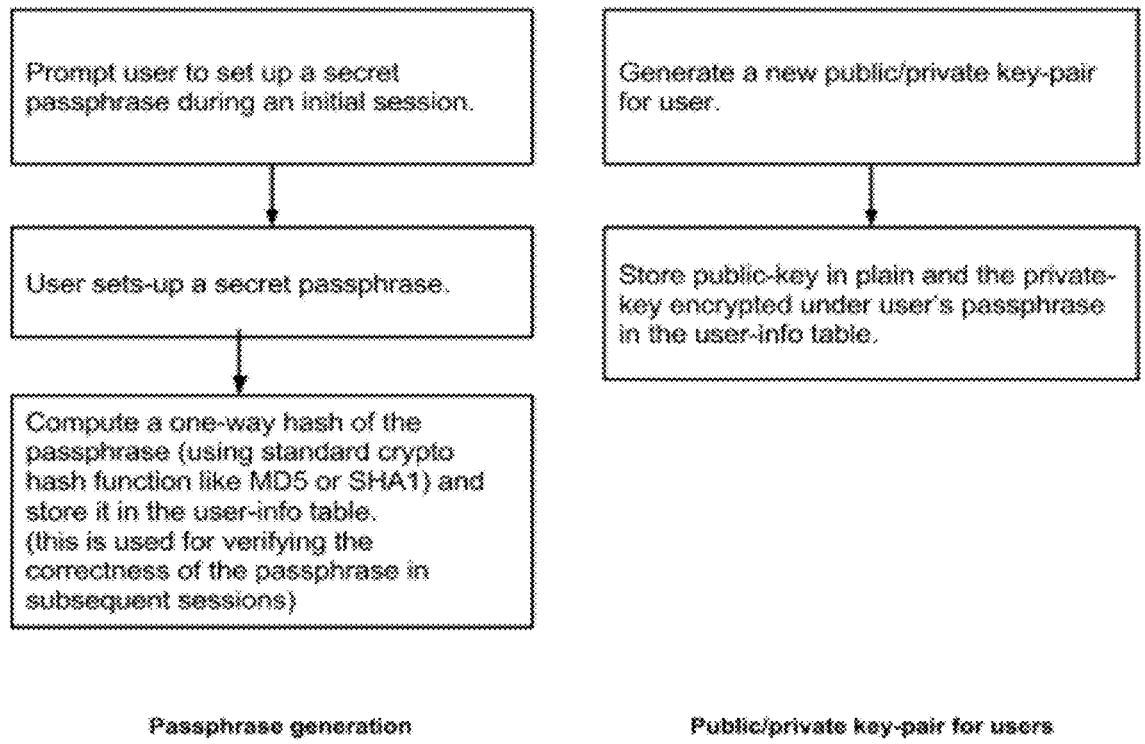
FIG. 6 shows steps involved in generation of passphrase and public-private key-pairs of a user, according to some embodiments.

Example embodiments of Encryption Key Management in EDS are now provided. In an embodiment of the present invention, the EDS provide encryption of all kind of files on the EDS server. The user logs into the EDS for the first time, he/she is prompted to set up a secret passphrase that is never persisted on the server-side. During the first session, public-private key pair is created for the user using the RSA algorithm as shown in process 600 of FIG. 6. The public-key is used for encrypting file with encryption keys (AES-256 keys) and the private-key is used for decrypting the cipher text to retrieve the file encryption keys used for opening or sharing protected files. Public-key is accessible to everyone, and hence it is stored in a server-side database in plaintext. However, the private-key needs to be stored securely. The EDS server stores the private-key encrypted under the secret passphrase of the user in a table. Whenever used, the user can be asked to provide the encrypted password to the server and it decrypts the private-key in memory and uses it to decrypt the desired file encryption (AES) keys.

The encryption keystore is a high-availability data store (could be a table in a relational database or a key-value store in the cloud, like the GAE datastore or Amazon S3). AES encryption keys are stored in the keystore, indexed by the (user-id, file-id), and encrypted under their public-key. If an encrypted file is shared with others, then its key is replicated, encrypted under the sharee's public key and stored as a new entry in the keys table. Resetting of passphrase is also possible. EDS simply re-encrypts the private-key under the user's new passphrase and store the new hash value (corresponding to the new passphrase) in the user-info table.

Referring again to FIG. 1, the key management system of EDS 170 includes a cloud-based (or on-premises) key-store and protocols for various key management tasks. A major security goal is that encrypted data and the corresponding (encryption/decryption) keys be maintained in separate locations preventing any malicious entity from accessing both easily. When the key and data are brought together (for encryption/decryption), the key and data are to be brought together for minimal period of time, thereby reducing the risk of compromise by a potential active attacker. Furthermore, a key recovery feature is provided for recovery of encrypted files. Finally, to prevent unauthorized access, the encryption-key access protocol may use a separate password-based authentication mechanism. A 2-factor authentication may also be added.

Example embodiments of File Encryption in EDS are now provided. In another embodiment, the EDS allows the user to Encrypt and upload the files. User selects one or more files from his or her own local machine using the EDS web interface. This file is then uploaded to the EDS server as a bytestream. The crypto module generates an AES-256 encryption key and encrypts the file to generate the ciphertext. A new drive file is created with the same name with the string '(encrypted)' appended as a prefix to the filename. A file extension '.enc' is appended to the filename. The encrypted file is written to a designated folder in one of user's linked cloud-drives.

In yet another embodiment, the EDS allows user to Select a file from one of the linked cloud drives and encrypt it. The user browses into a file folder within one of his cloud-drives using the EDS web interface and selects the files that he wants to encrypt. The selected file is read into the EDS server as a bytestream. The EDS server generates an AES-256 key and encrypts the file to generate the ciphertext. A new drive file is created with the same name with the string '(encrypted)' appended as a prefix to the filename. A file extension '.enc' is appended to the filename. The encrypted file is kept in a designated folder in one of user's linked cloud drives.

The AES-256 file-encryption keys are themselves encrypted under the user's public keys and persisted in the key-store in the cloud. The newly created file's identifier is used as the unique key-value for the AES encryption key corresponding to the file.

Further, the file encryption routine also extracts any textual information before the content is encrypted. Standard off-the-shelf parsers are used to parse popular document types like PDF, DOC, XLS, PPT and TXT files. Then, the document coloring algorithm is executed on the set of extracted keywords returned by the parser (details of it are given later). The output of the coloring algorithm is typically a set of byte-64 encoded string and a set of color-tags (text strings). This forms the metadata for the file and is stored in a suitable metadata field associated with the file.

Example embodiments of decryption of files in EDS are now provided. In still another embodiment, the EDS allow the user to choose the files to decrypt from the EDS web UI. The user is requested to input their secret passphrase. EDS server fetches the passphrase-encrypted private key from the keystore, decrypts the private-key under the passphrase. EDS also retrieves the AES encryption key for the selected file from the keystore. Recall, the AES key was encrypted under the user's public-key. Therefore, EDS uses the user's private key to open the AES key. Once the AES key is retrieved, EDS can simply decrypt the file. EDS gives users several options for opening the file after decryption—it can be stored in a designated folder, or downloaded to one's machine etc. EDS use RSA for public-private key pairs.

Password-based encryption to encrypt the private-key and AES-256 keys to encrypt the file contents.

Example embodiments of encrypted file updates in EDS are now provided. Sharing and collaboration are important features of public cloud applications. Therefore, EDS supports "secure document updates" to enable people to edit and collaborate on documents easily without compromising on its security. Consider the following two kinds of file-update scenarios that EDS supports on encrypted files.

(1) Alice stores a work document file A.doc (in MS-word format) in encrypted form in her cloud drive. However, she occasionally can update/edit the contents of this file. Such a file might be shared with few colleagues of Alice's, who can edit it as well. It can be assumed that whenever someone with permission to A.doc can edit it, they will decrypt and download it to their machine and edit it locally. However, a mechanism to update the underlying contents of the encrypted shared document can be provided so that all people with permissions for it get access to the new content.

(2) Alice is the manager of an engineering team. She also has to interact with the Products team and share documents with them. Say, Alice has shared a MS-word file A.doc with her colleagues in the Products team. Now, Alice has a new version B.doc, which she worked on with her own engineering team. Both A.doc and B.doc are hosted in the cloud and stored encrypted at all times. However, now, Alice wants to update the contents of A.doc by the contents of B.doc so that the Products team has access to the new updated content.

EDS supports both of these update scenarios for users. In (1) it updates the content of an encrypted file in the cloud by the contents of a plaintext file. In (2) it replaces the contents of one encrypted file with the contents of another encrypted file. In both cases, note that all individuals with access permission to the files are be able to access the new updated content without having to do anything new. Here is the pseudo-code for the secure file update algorithm:

An example Secure File Update algorithm is now provided.

1. Choose the encrypted file to update (Target)
2. Choose the source of the new content (Source)
   a. Source file is in the cloud
   b. Source file is on user's machine
   If Source file is encrypted
   a. Decrypt source with suitable key
   b. Copy content of source→P
   c. Acquire key of target file→kt
   d. Encrypt source content with kt→C=E (P, kt)
   e. Replace content of target File with C.
   If Source file is in plain text (not encrypted)
   a. Grab content from file→P
   b. Acquire key of target file→kt
   c. Encrypt source content with kt→C=E (P, kt)
   d. Replace content of target File with C.

An example search over encrypted documents in EDS is now discussed. In still another embodiment, Search over encrypted files is enabled through the state of the art solutions for secure data annotation (also referred to as secure metadata or secure indices) for function evaluation and search. The format of this metadata lets EDS to store it along with the data and allows EDS to leverage existing functionalities of the underlying application to implement those features on the encrypted data directly. For instance, EDS uses indexing and search functionality of Google® Drive to implement efficient and scalable full-text search over the user's collection of documents, encrypted or otherwise, across all of his linked public-cloud storage accounts. Search queries may be appropriately transformed to allow execution on the encrypted data, thereby revealing minimal information. The metadata used for indexing is computed in a special manner, so as to limit the risk of any partial information disclosure about the sensitive information within the data/file.

User issues search queries from the EDS user interface (web or mobile). EDS supports keyword and pattern-based search over the set of user's documents in the connected clouds. When users encrypt files, the file data is first parsed to extract textual information that is relevant to answering search queries. This data is then fed to our 'document coloring algorithm' which generates the metadata to be stored as along with the encrypted files.

Various example aspects of a secure search in EDS are now provided. (1) Secure document storage and annotation: The document coloring algorithm for generating secure metadata for indexing and search on the cloud. The secure storage part also consists of persisting the encryption keys in a key-value data store in the cloud so that they can be retrieved or shared.

(II) Search query execution: The metadata is used by the cloud storage service as well as the EDS server to evaluate search queries issued by a user from a client device (desktop/laptop or mobile device) and return matching results to the user's device.

Figure 7:
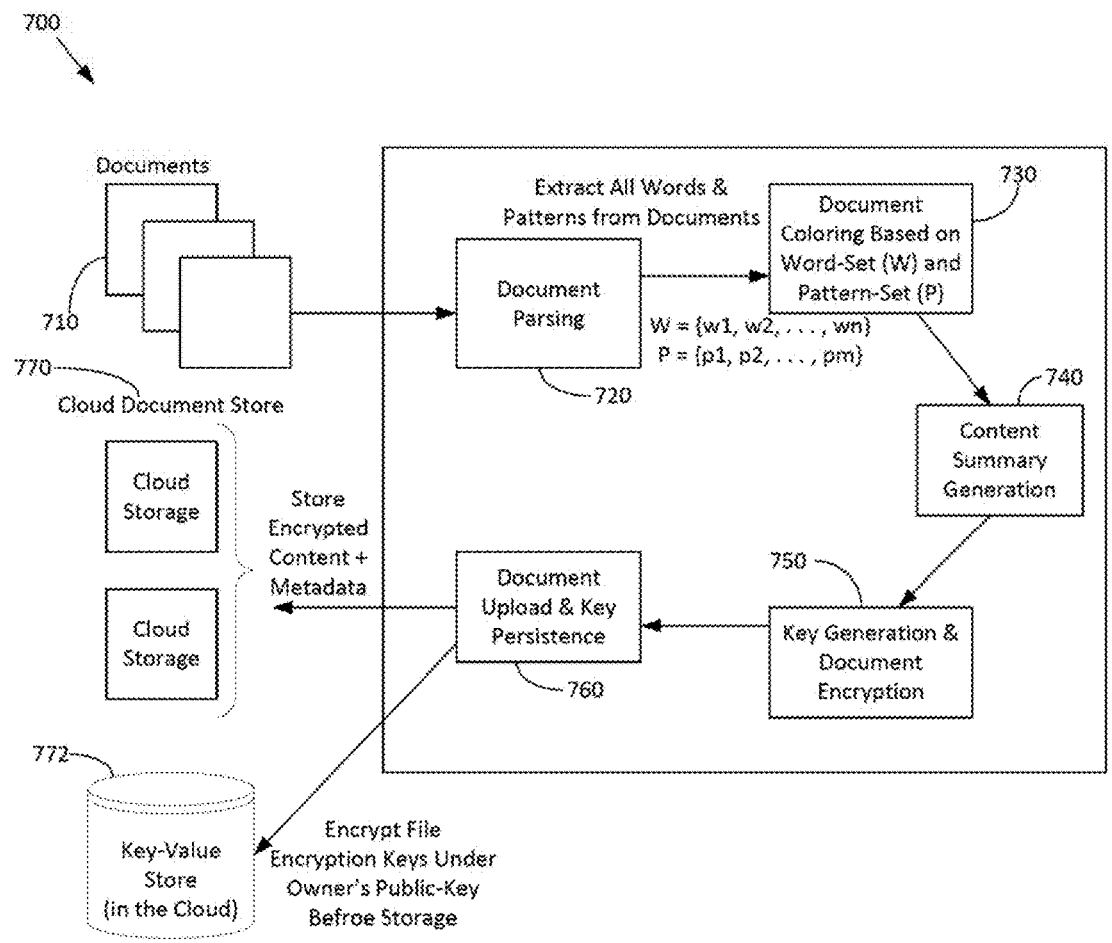
FIG. 7 shows steps involved in coloring and storing document and keys in EDS, according to some embodiments.

(I) Secure Document Storage and Annotation in EDS:

Referring to FIG. 7, documents are first selected for encryption and storing in the cloud 710. The documents are parsed to extract words and patterns from the documents 720. EDS 700 generates metadata for documents based on the keywords contained in the document.

Document coloring is performed based on the extracted word-set (W) and the extracted pattern-set (P) 730. A part of the metadata generated for a document is referred to as the color-tags of the document. The process in generating the color-tags from a document is referred to as the document coloring process (or simply the coloring process). Different kinds of documents may be parsed and indexable text is extracted based on keywords and patterns present in the document. The process of coloring a document based on extracted information involves, initialization of the color parameters as per user's instructions/security requirements (referred to as user's coloring scheme), a coloring process based on set of keywords in document and a coloring process based on set of patterns extracted from the document.

Document content summary is generated 740. The content summary may be stored in metadata field. One or more Bloom filter(s) may be created per document and stored as metadata associated with the document. Bloom Filters are compact data-structures used for "set membership queries" (refer to the "Definitions" section earlier). Bloom Filters are used by EDS 700 for checking if a keyword is present in a document returned from the cloud store to the EDS 700 in response to a translated query. According to one embodiment, the Bloom Filters may be serialized (i.e., in-memory objects can be converted into a suitable ASCII/binary string that can then be written to a file or a storage medium) and stored along with the color-tags in one metadata field. In another embodiment, the Bloom Filters corresponding to a document may be stored in a separate key-value datastore in the cloud. In yet another embodiment, multiple Bloom Filters may be used per document to record the presence of keywords depending upon the frequency (popularity) with which the keyword appears in a random user query. After generation of the content summary 740, key generation and document encryption are performed 750. Then, the document may be uploaded and key-values are stored in the cloud 760.

When a first user of EDS 700 shares a protected (encrypted) document "d" with a second user, EDS 700 shares the AES encryption key of document "d" with the second user using a public-key based sharing mechanism. EDS 700 enables the second user to retrieve d in response of a search query if the query predicate is satisfied by document "d." To enable this, EDS 700 may execute document parsing, document coloring based on word-set (W) and pattern-set (P) for document "d" using the coloring scheme of the second user. However, with multiple users, there may be optimizations possible for speeding up the coloring of documents when they are being shared with multiple users. For example, the EDS may decide that there should be a common coloring scheme to be used for a "secure shared folder" (i.e., which stores files in encrypted format). Then all users of EDS who have access to this shared folder will use the same coloring scheme to write files into the folder or issue search queries against it.

Color tags generated for document "d" that are associated with the first user (the owner) are stored in the metadata field of document "d." However, tags generated for the second user may be stored separately in a different indexable datastore or a key-value datastore in the cloud. This helps in easy removal of the color-tags of the second user if the first user chooses to 'unshare' the document at a later time.

A detailed description of the Color Tagging Concept (document coloring algorithm) is now discussed. To make an encrypted document searchable, EDS generates some 'metadata' from the contents of the document before encrypting and storing it in the cloud. Generally, the cloud storage services may index not only the content of documents but many of the associated metadata fields to make them searchable. For instance, the underlying cloud store may index the following metadata fields besides the content (body) of the document—'document title' field, the 'document description' field etc. The EDS generates a set of color-tags for a document, which are basically a list of tags (text strings) like these—'color_23434', 'color_654' etc. These strings are then written into one or more of the metadata fields of the document (separated by blank space) that are indexed by the underlying cloud service.

Each distinct keyword or indexable string (strings separated by space from others) of alpha-numeric character occurring in the body of the document is first identified and mapped to one color randomly from a set of k colors, where k is a small integer like 10, 15, 20. The set of k colors for a string is selected out of the 'set of all colors', which is typically much larger N~10,000 sized fixed set of color-tags. The k-set for each string, referred to as the 'color-code of the string/keyword' is also fixed. For example, let k=5 and say, the keyword 'computer' has the color-code {c1, c22, c390, c1264, c5009} chosen from the set of all color tags {c1, c2, ..., c10000}. Then, in a document d_A containing the keyword 'computer', it might be mapped to 'c1' and in another document d_B also containing the word 'computer' it might map to 'c1264' and so on. Once each (distinct) string in a document is mapped to a color in this way, the set of all color-tags in the image set of the document (i.e., the set of colors to which one or more words in the document have been mapped to) are written into the metadata field. Note that the document color-index cannot be larger than 10000 tags in this case.

The second important component of the metadata field of a document is the byte-encoded representation of its Bloom Filter. (Any object/data structure in the memory can be serialized into a text string and stored (persisted) and later again 'deserialized' and read back into the memory by another function when needed.)

The above-mentioned scheme for representing encrypted documents in the cloud, i.e., using color-tags in metadata field, is what is referred to as the noisy/randomized representation of data. It is also referred as a 'obfuscated representation' of the document. Randomization comes from the fact that the color-tags are chosen randomly from the color-code of each keyword in the document and obfuscation results from the fact that multiple keywords might map to a single color and therefore, by looking at the color-code the cloud service provider is not able to guess which keyword might be actually be present in the corresponding document.

An example embodiment of pattern extraction and indexing is now provided. According to the present invention, to execute pattern queries (example given below) on documents that are stored in encrypted form in the cloud, the EDS extracts pattern information from document before encryption. For each word-window of length 'k' in the document, where k is an input parameter (could be something like 4-5 for instance), extract all the distinct trigrams appearing in the string (consists of k consecutive words from the document). Then, generate all one, two and three sets from each of these trigram-sets. These (1, 2, 3)-sets represent the trigrams that appear together in the string (k-word string). For each distinct trigram set extracted from a document (i.e., from one or more of the words in the document), the system generate a unique string by concatenating them in a lexicographic order with a stop ('.') inserted between two trigrams. The system will refer to them as trigram-words or t-words for short. The t-words will be treated as unique words in the document. [Note: Each document can result in t-words of length 3, 6 or 9 since EDS concatenates 3 trigrams at most. So, for each unique t-word in the document, system generates a color-set. Then, system includes one or more colors (using our coloring algorithm) from each color-set into the document index as done for regular keywords. Similar to keywords, EDS create a Bloom filter for patterns that will be stored in the metadata field along with the document. The pattern-BF is used to represent the set of (distinct) t-words in the document.

(II) Search Query Evaluation in EDS:

Metadata is used by the cloud storage service as well as EDS 800 to evaluate search queries issued by a user from a client device, e.g., personal laptop or mobile device, and return matching results to the user's device. Query classes supported by EDS 800 may include keyword queries, multi-keyword search queries using, for example, Boolean connectives 'AND' and 'OR' to specify the selection criterion. Text-pattern based queries look for a text pattern that is a regular expression or a subset thereof such as the one supported by typical SQL-Like query semantics, on the set of alphanumeric characters is specified by the user.

The user launches a search by issuing a simple query term like 'computer' or a more complex Boolean expression like 'computer AND (science OR engineering)' into the search bar from the client (a web browser-based application or a mobile app interface). The query expression is conveyed to the EDS server as it is by the client application. The EDS server then translates this query expression to one that can be run over encrypted documents stored in users' cloud stores. Since the body of the encrypted text is all garbled the query issued to the cloud by the EDS server has to map the original user query to the domain of the color-tags stored in the metadata field of a document.

An example portion of search is processed in the cloud is now provided. Referring back to the example given earlier, let the user query be the keyword 'computer', i.e., user wants to retrieve all documents, which contain the word 'computer' in its body or title. Then, EDS server will issue the following query (q) to Google 'color$_1$ OR color$_{22}$ OR color$_{390}$ OR color$_{1264}$ OR color$_{5009}$', which will retrieve any document that contains these strings in its title, body or any of the searchable metadata fields. Google (i.e., the cloud) processes the query 'q' and returns all the matching documents' metadata to the EDS server in some sorted order (typically on 'last accessed/modified time stamp').

An example portion of search is processed on the EDS server is now provided. The translation of the user query from its original form to the Boolean form shown above is done on EDS server. Then, after the matching results are returned by the cloud application, the pruning of false-positives (described next) is done on the EDS server after which the results are returned to the client where user gets to see the results.

A method of pruning false positives is now provided. From each metadata field returned to the EDS server, it recreates (deserializes) the corresponding document's Bloom Filter and then checks if the original query term ('computer' in our running example) is present in the Bloom Filter or not. (Refer above to see how a presence of an element is checked in a Bloom Filter). If it returns 'Yes', then the title and link of this document is added to the list of items to be sent to the client application. All the others (e.g. that return 'No') are pruned.

Figure 8:
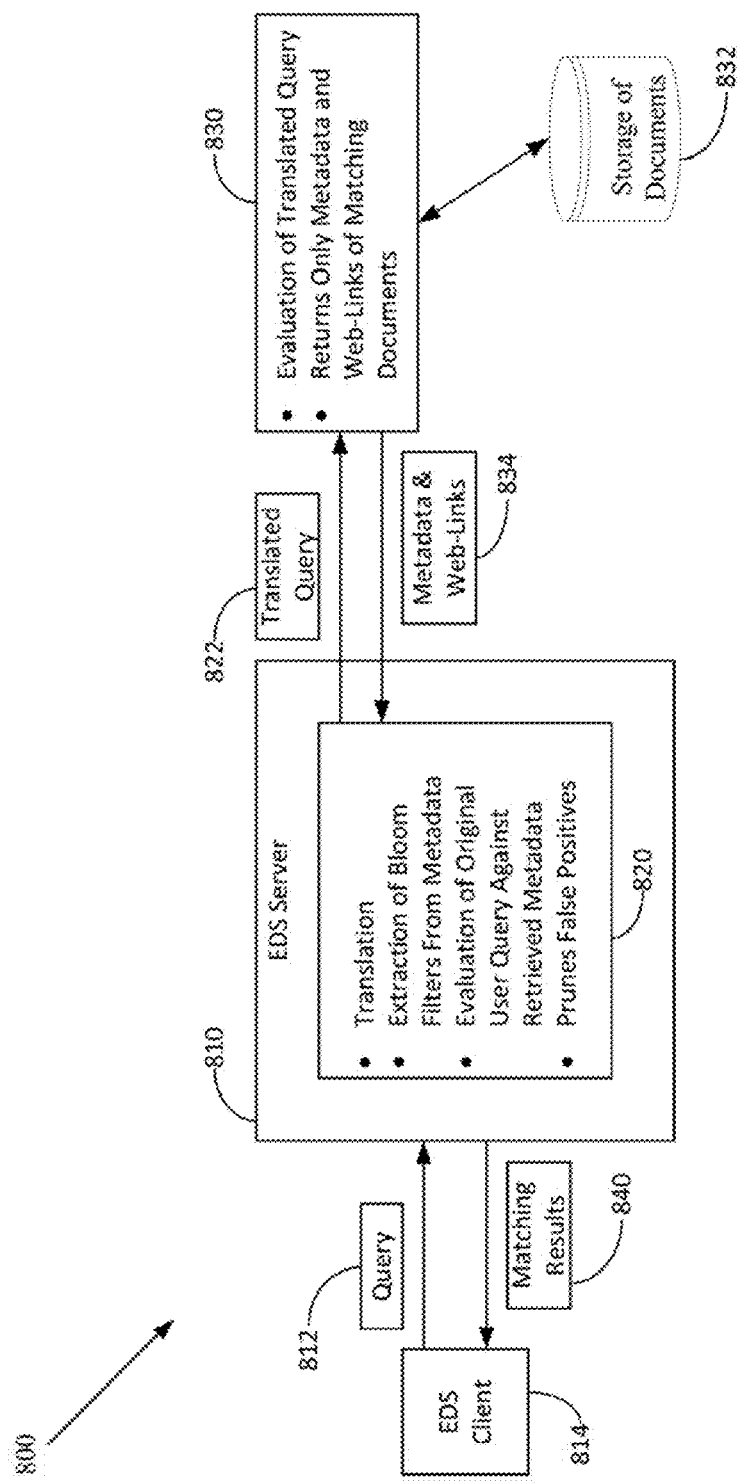
FIG. 8 shows steps involved in search query evaluation process in EDS, according to some embodiments.

FIG. 8 illustrates a process executed by EDS 800 for executing a search query according to an embodiment. In FIG. 8, a server of the EDS 810 receives queries 812 issued by a user through use of an EDS client 814 and then performs query translation 820. The EDS 800 issues the translated queries 822 to the cloud 830. The cloud 830 evaluates the translated queries against stored documents 832. The cloud 832 then returns metadata and web-links 834 of matching documents 832 to the EDS server 810. The EDS server 810 extracts Bloom Filters from the metadata 834 and evaluates the original user query 812 against the returned metadata 834. The EDS server also prunes false positives from the metadata associated with the original query 812. The EDS server 810 then returns a final set of matching results to the EDS client 814 in paged format. The EDS client 814 may also be used to pull more results 840.

Ranking: There may be several embodiments for processing and evaluating the query response to generate the result set to be shown to the user. Ranking of query results is generally performed by "last modified/accessed" timestamp of the documents. Some of the planned query processing optimizations may include issuing partial queries to the cloud server, e.g., when the server response is dependent upon the query complexity such as in a multi-keyword 'AND' (conjunctive) query, wherein the translated query may be generated using a part of the Boolean query expression (subquery).

Various optimizations can be implemented. While evaluating the returned result set from the cloud on EDS 800, statistics gathered about the popularity and frequency of occurrence of a query term in the document repository may be used to decide how to query the Bloom Filters in order to achieve fastest possible pruning of false positives. Main memory optimizations may be used for evaluating membership queries simultaneously (or in parallel) against a large number of Bloom Filters.

Example embodiments of evaluating pattern search queries in EDS is now discussed. For evaluating patterns in queries (or keywords for that matter) EDS can extract from the query expression, the unique trigram sets. For instance if the query is "hippo %", then EDS extract 3 trigrams 'hip', 'ipp', 'ppo'. The t-word generated from this would be 'hip.ipp.ppo'. Then query issued would be the OR of the colors in the set color-set ('hip.ipp.ppo'). This query would be issued to Google and the returned set of file metadata would be checked for actual existence of the query pattern. After the file metadata is retrieved, EDS will deserialize the pattern Bloom Filters for the files returned and check the presence/absence of the patterns from the query in the pattern Bloom filters.

Example: Query "hippo %" generates one t-word—'(hip.ipp.ppo)'. However, the query "hippo % mus" will generate a more complex conjunctive query—'(hip.ipp.ppo) AND (hip.ipp.mus) AND (hip.mus.ppo) AND (ipp.mus.ppo)'. From the returned list of file metadata from Google, the system will extract the pattern-BFs and check if all of these t-words are present in each of the BFs or not. If the system finds a match, then it will include the file name in the final result list.

Example embodiments of sharing documents securely in EDS is now provided. In still another embodiment, the EDS allow the user to share protected files and documents. Encrypted documents can be easily shared with other users of the EDS platform. However, to make it accessible EDS also can make the encryption key available to the sharee. The encryption key sharing is done using standard public-key framework. The file encryption key is first decrypted using the owner's private key. A copy of the AES key is created by EDS server, and encrypted under the sharee's public key. This encrypted version of the copy of the key is stored in the keystore under the sharee's identifier and shared-document identifier. When the sharee wants to open the shared file, the EDS server locates his copy of the file key in the keystore, asks him to input passphrase and decrypts his private-key using the passphrase. Then, decrypt the file key using his private-key. This key is then used to decrypt the file in question and served back to the requesting user.

Multiple files can be shared at once with one sharee or with multiple users. One may mix sharing of encrypted and plain files in the same workflow. Sharing can be revoked simply by unsharing the underlying file. Also, the copy of the shared key is deleted from the keystore.

Further, Secure sharing also let the owner to associate several different kinds of restrictions with a file. For example, the file-owner may restrict the file to be viewed online only and not allow downloading. (A file may be exported to a PDF format to enable online viewing). File access can be revoked after a certain time-interval manner. One should be able to set time-based expiry of shared status.

Example embodiments of secure folder-based sharing in EDS is now provided. In still another embodiment, the EDS allow user to share sensitive files and documents via secure shared folders. This is another convenient mechanism to share files with other users of EDS. Users can create "secure folders" from the EDS UI and share them with others. The creator of a secure folder can associate specific security policy with each folder and additionally with each file in the folder if desired. For instance, the creator may decide to restrict actions like download or printing of any files from the folder (i.e., files can only be viewed online in that case).

The creator of a secured shared folder has 'admin' privileges and other sharees to the folder will have normal 'user' privileges by default. Admin privileges allow one to set folder-level policies, which by default apply to all files in the folder. However, sharees can specifically override some of these policies for files that they add to the folder. For instance, say Alice is the admin and she chooses to block download of any files from a secure folder that she created and shared with Bob and Carol. However, when Bob uploads a file to the shared folder, he may choose to override the 'no download' policy and allow that particular file to be downloaded. When people are bulk uploading files to a secure folder, there is a convenient interface provided to specify policies that are applied to all files being uploaded to the cloud.

Figure 9:
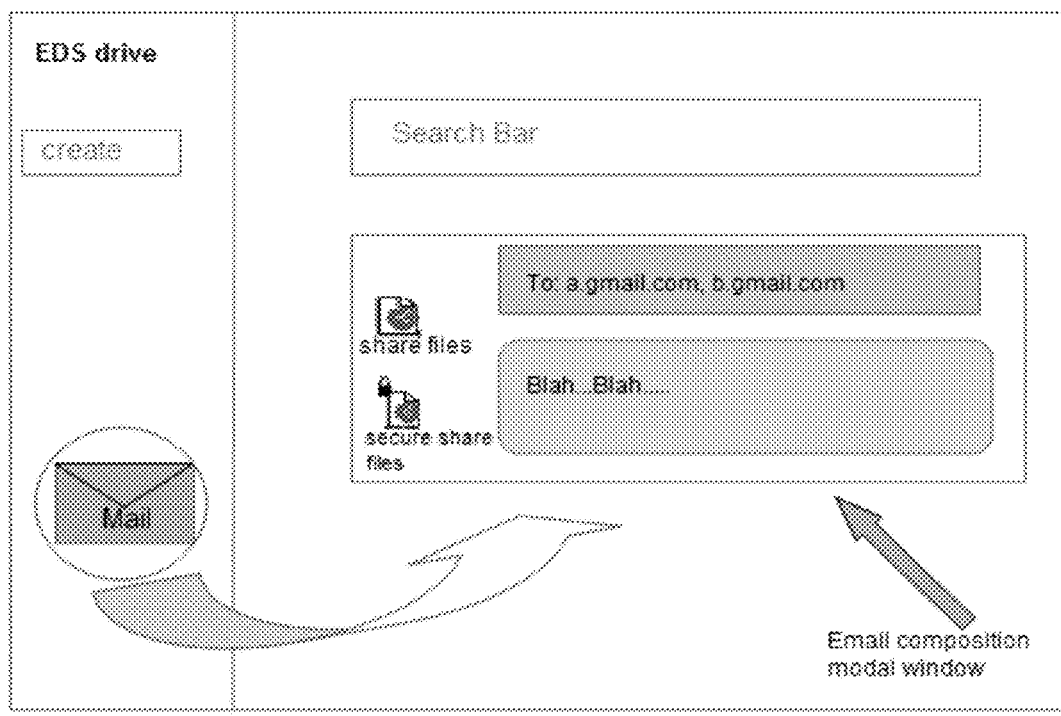
FIG. 9 illustrates of email based sharing in EDS system, according to some embodiments.
Figure 10A:
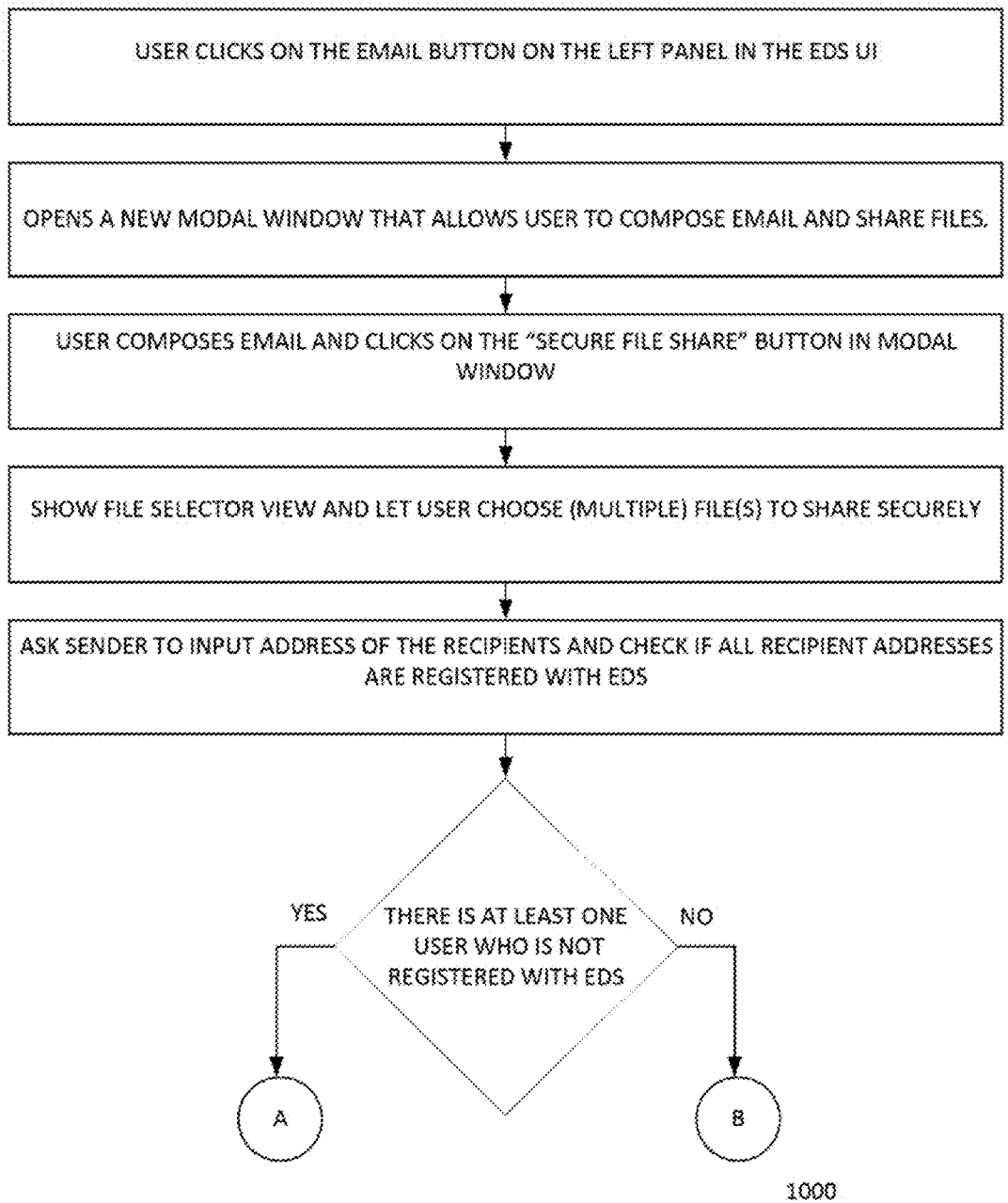
FIGS. 10 A-B illustrates encrypted file sharing with Email (sender flow), according to some embodiments.
Figure 10B:
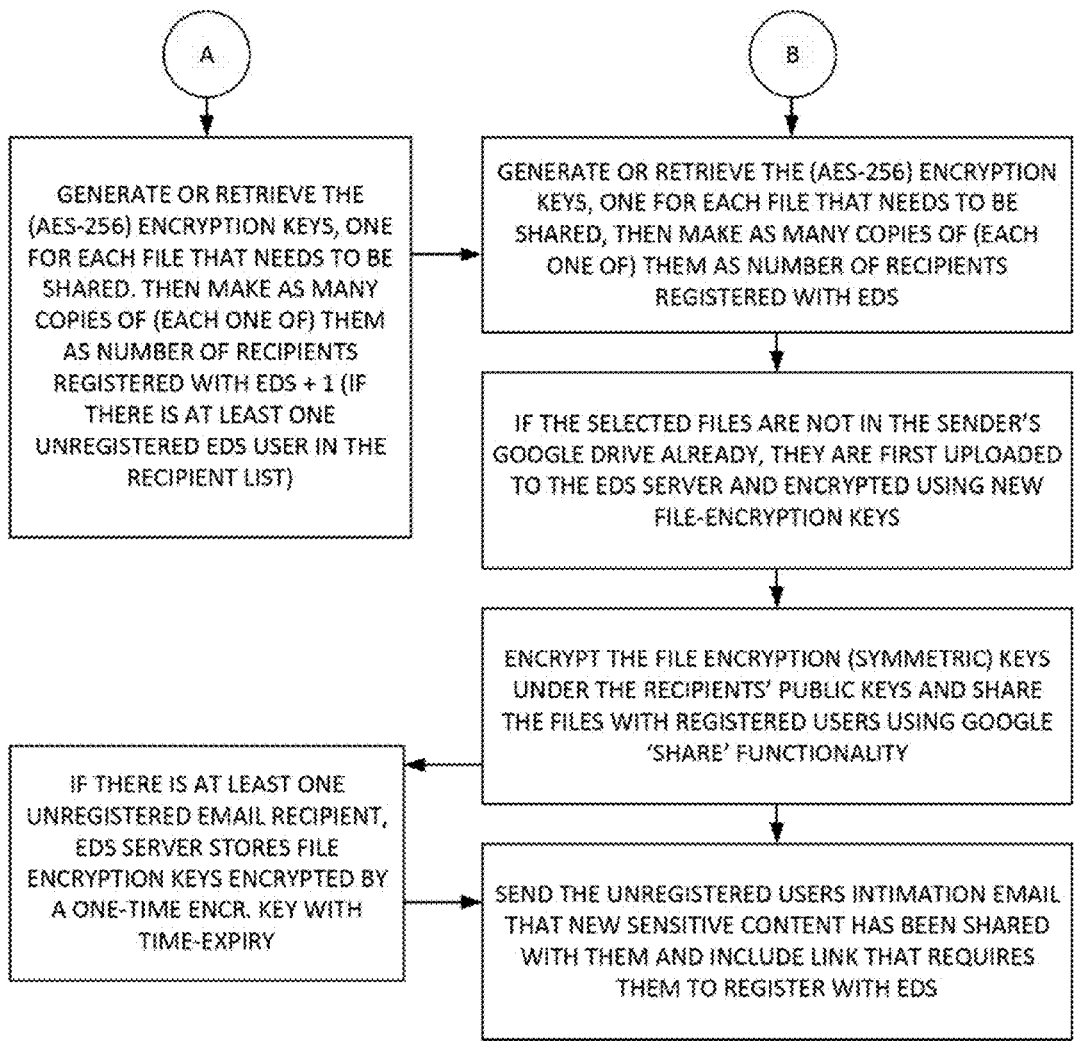

Example embodiments of email-based secure sharing in EDS is now discussed. In still another embodiment, the EDS allow users to send emails with encrypted documents at "shared attachments" right from the EDS UI. FIGS. 10 A-B illustrates the sender flow 1000 of encrypted file sharing with email using the example of Google as the underlying storage provider. User clicks on the email button on the left panel in the EDS UI and opens a new modal window that allows the user to share email and share files as shown user view 900 in FIG. 9. User composes email and clicks on the "secure share files" in the modal window, further, it shows file selector view and let user to choose either single or multiple files to share securely. Then, the system ask sender to input address of the recipient. Check if all the recipient addresses are registered with EDS. If there is at least one user who is not registered with EDS, then generate or retrieve the (AES-256) encryption keys, one for each file that can be shared. EDS makes as many as number of copies (each one of them) them as number of recipients registered with EDS and additional EDS server stores file encryption keys encrypted by a onetime encryption key with time expiry. If all the recipients are registered with EDS, then the user can generate or retrieve the (AES-256) encryption keys, one for each file that can be shared. EDS makes as many as number of copies (e.g. each one of them) as number of recipients registered with EDS. If the selected files are not in the sender's Google Drive already, then the user can first upload to the EDS server and encrypt under new file encryption keys. Encrypt the file encryption key under the recipient's public keys and share the files with registered users using Google Drive's 'share' functionality. Send the unregistered users intimation email that sensitive content has been shared with them and include link that uses them to register with EDS. The extra copy of the keys are encrypted with what is called the "holding key". This expires after a designated period of time (e.g. two (2) weeks). To access encrypted files the user has to sign up for EDS. This onetime temporary key expires after a given time period and recipient have to ask for permission once again from sender. With the file encryption keys, the names of the unregistered recipients are also maintained on the EDS server. Once a user from this list registers with EDS, all file encryption keys stored temporarily for his name are copied under his (new) public key and shared with him. After expiry date is past, the recipient loses access to a file and its encryption keys.

Figure 11:
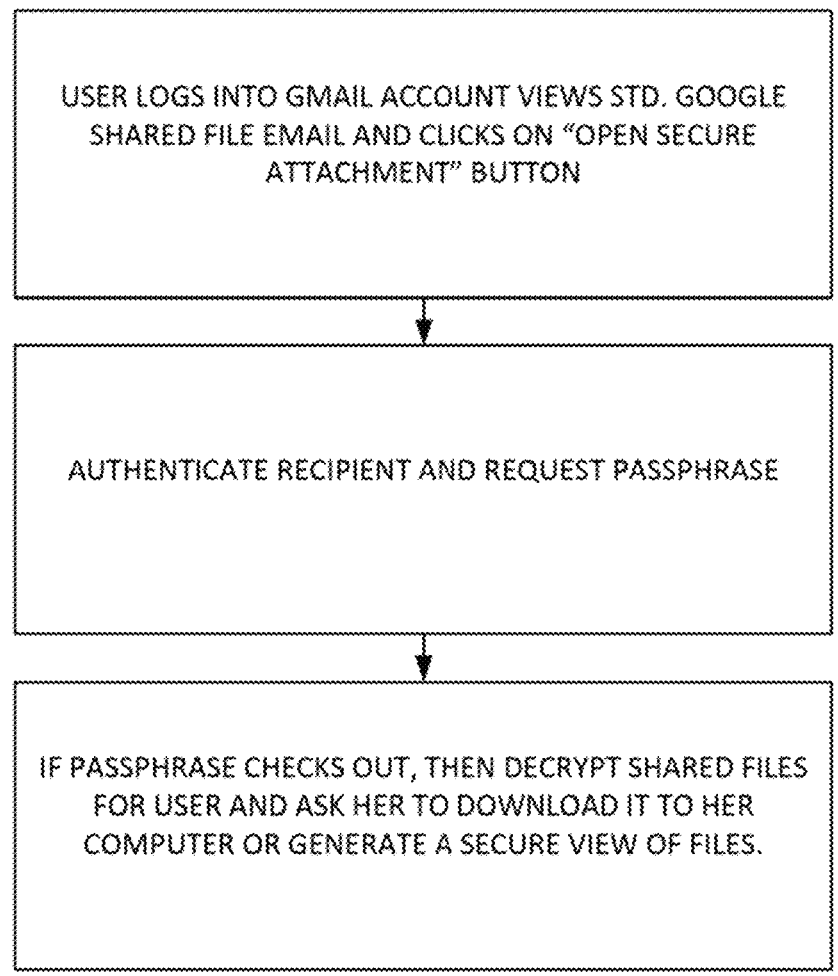
FIG. 11 illustrates receiver flow of registered EDS user, according to some embodiments.

FIG. 11 illustrates receiver flow 1100 of registered EDS user using Google's Gmail application. User logs into Gmail account and sees Google shared file email and to open, clicks on "open secure attachment" button. EDS asks user for EDS passphrase to authenticate recipient. If the passphrase checks out, then decrypt shared files for user and asks the user to download it to user computer or generate a secure view of files.

Figure 12:
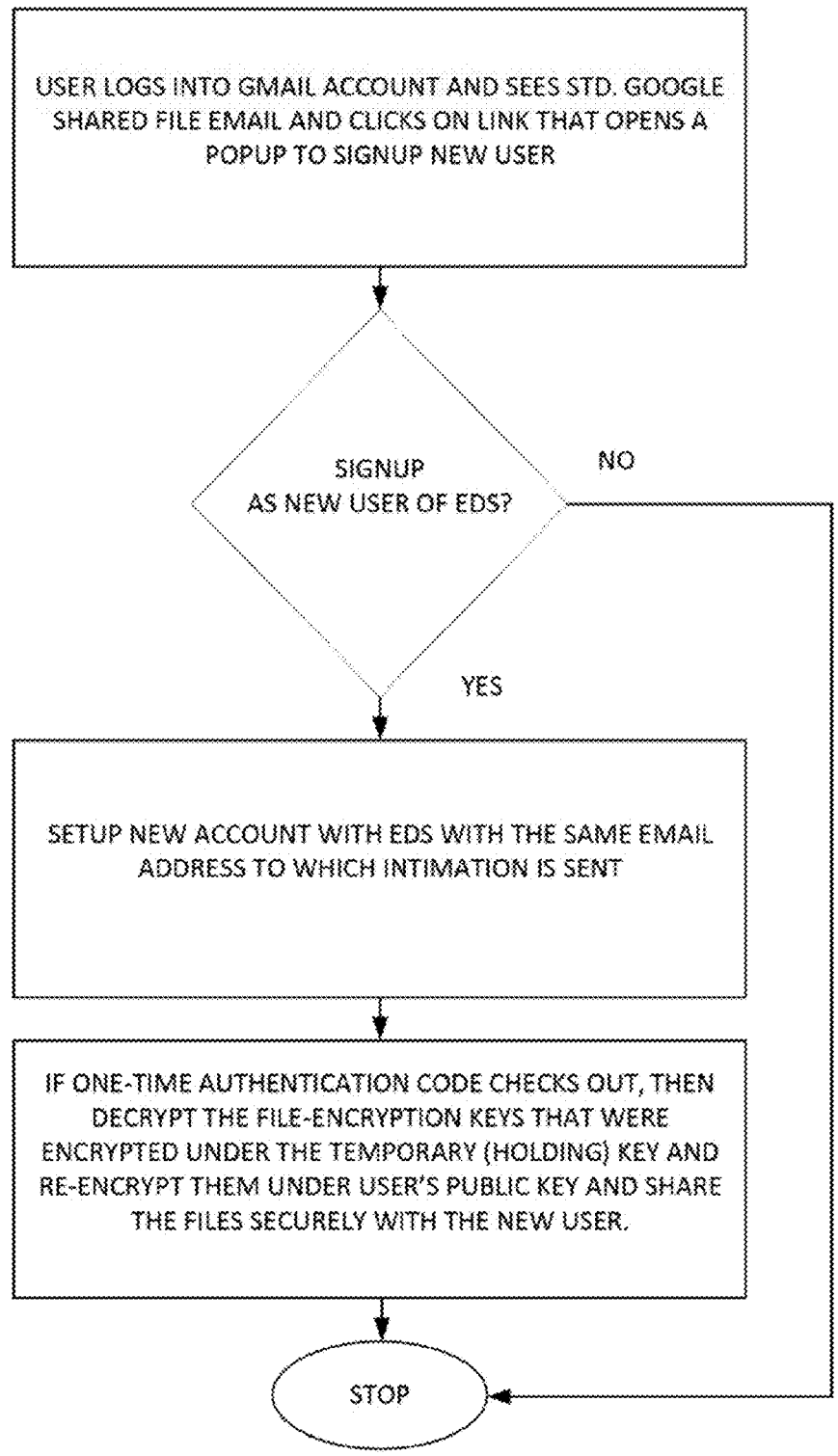
FIG. 12 illustrates the receiver flow for unregistered EDS user, according to some embodiments.

FIG. 12 illustrates the receiver flow 1200 for unregistered EDS user. User logs into Gmail account and sees standard Google shared file email and clicks on link that opens a popup to signup new user. If the user sign up to use EDS, a new account is setup with EDS with the same email address to which intimation is sent. If user's authentication code checks out, then the system decrypts the file encryption keys that were encrypted under the temporary (holding) key and re-encrypt them under user's public key and share the files securely with the new user. If the user did not sign into EDS further action is prohibited.

Example embodiments of extending EDS capabilities to connected cloud accounts are now discussed. In still another embodiment, EDS is able to provide new features and capabilities across connected cloud stores, such as full-text search and sharing files securely with contacts across clouds.

Example embodiments of full-text search over all connected cloud drives are now discussed. According to the present invention, EDS is able to extend full-text search over all connected cloud drives. In one embodiment, this feature is enabled by utilizing Google Drive's or Google App Engine's indexing and search mechanism. Here is a broad description of the steps involved.

When a new cloud storage account is connected to EDS, get list of all files in the newly connected cloud drive. From each file, relevant textual information keywords and pattern information is extracted. From the extracted information metadata is generated. Metadata consists of two components, an indexable component and a second ("summary") component. The indexable component is basically a set of text strings. These are computed in a manner similar to how it is done for encrypted files. However, since there are no security constraints to be met in this case, the goal is to maximize the efficiency of search query evaluation, thereby to minimize the number of false positives returned from the server.

EDS maps each distinct pattern or keyword to a unique tag from a given universe of tags (a simple hash algorithm where each pattern or keyword is hashed to a single tag). However, for preventing the metadata portion from getting excessively large, EDS selects the hash tags from a fixed universe of strings. The summary component is same as that in the case of encrypted files. It is a Bloom Filter data structure that encodes the presence or absence of keywords in the document. The EDS may optionally choose to keep more than one Bloom filter per document. For instance, EDS might choose to split the encoding of elements (keywords/patterns) into multiple sets if the document is large. Alternately, EDS might choose to encode the same set of elements into two or more independent Bloom Filters. Both approaches tend to eliminate more false positives.

Further, there are two options to store metadata for indexing and querying purposes: (a) the metadata components for each file can be stored along with its content (body) in an associated field with the document itself. Then, the EDS create a contentless (empty) placeholder file within Google Drive for every file in another cloud drive (they are similar to "symbolic links" used in UNIX). These placeholder files are simply created to be indexed and made searchable. If they match the search criteria, the associated link (to the original file) is provided to the user or (b) the metadata is persisted separately in a high availability data store (such as the Data store in Google App Engine) for quick access. Then, the EDS create a document index on EDS server side which stores the Bloom Filter and tags in separate fields of the entry associated with a document. The transformed query is evaluated against the tags stored in the index.

Various methods of updating indices can be implemented. For example, all files that have been removed, updated or added/created to the connected drives will cause changes to the stored index data. When files are added from the EDS interface, the changes will be reflected in the index right away. However, since files may be added to the cloud drives from outside the EDS UI or sharing mechanism, maintaining updated indices for search can utilize regular scans of the drives to detect changes. Such scans while done regularly might still result in some delay in reflecting the updates in search results. Since the state reflected in the search index could be stale.

Example embodiments of sharing of files with contacts across clouds, according to some embodiments. In still another embodiment, the EDS allow its user to share documents and files across clouds securely. For instance, user of EDS can seamlessly share files between themselves irrespective of what backend cloud drives they have connected to their EDS account.

Case 1: If Alice wants to share a file in her Dropbox with Bob where Bob also has an account with Dropbox that is connected to his EDS account, then EDS uses the Dropbox's underlying file sharing mechanism (via API calls) to share the document with Bob. If the file is encrypted, then EDS makes sure that the encryption keys get shared securely with Bob as well.

Case 2: If Alice wants to share a file in her Dropbox with Bob but Bob does not have a Dropbox account connected to EDS, then EDS facilitates this slightly differently. It creates a shared softlink to the shared file in her Google Drive and shares the link with Bob via Google.

Figure 13:
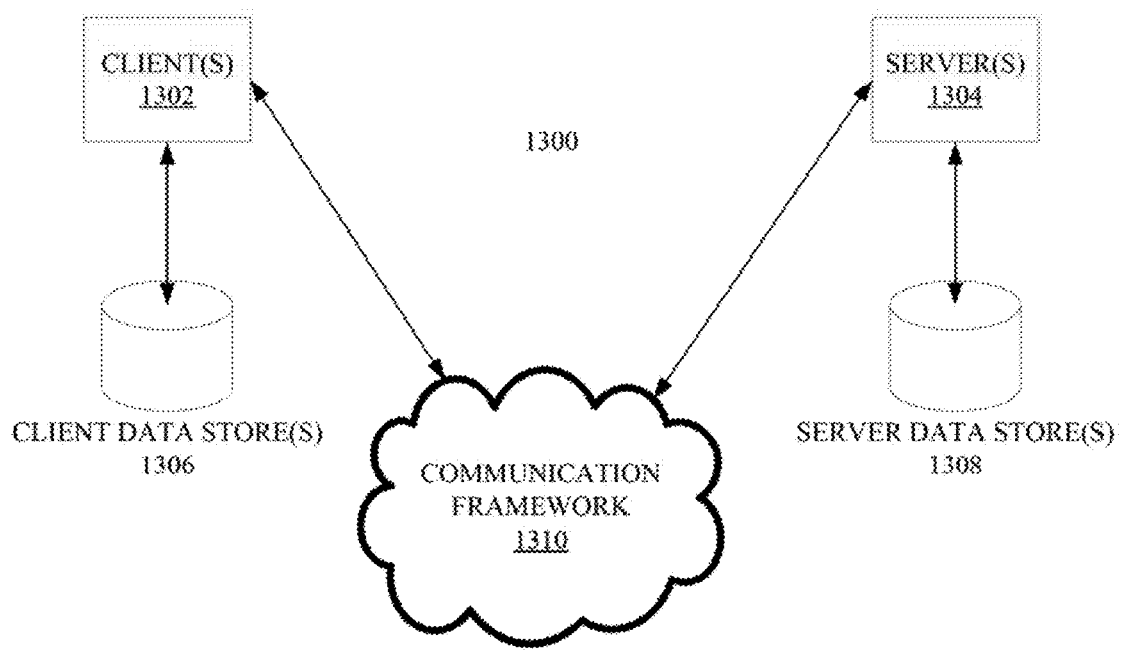
FIG. 13 is a block diagram of a sample computing environment that can be utilized to implement various embodiments.

FIG. 13 is a block diagram of a sample computing environment 1300 that can be utilized to implement various embodiments. The system 1300 further illustrates a system that includes one or more client(s) 1302. The client(s) 1302 can be hardware and/or software (e.g. threads, processes, computing devices). The system 1300 also includes one or more server(s) 1304. The server(s) 1304 can also be hardware and/or software (e.g. threads, processes, computing devices). One possible communication between a client 1302 and a server 1304 may be in the form of a data packet adapted to be transmitted between two or more computer processes. The system 1300 includes a communication framework 1310 that can be employed to facilitate communications between the client(s) 1302 and the server(s) 1304. The client(s) 1302 are connected to one or more client data store(s) 1306 that can be employed to store information local to the client(s) 1302. Similarly, the server(s) 1304 are connected to one or more server data store(s) 1308 that can be employed to store information local to the server(s) 1304.

Figure 14:
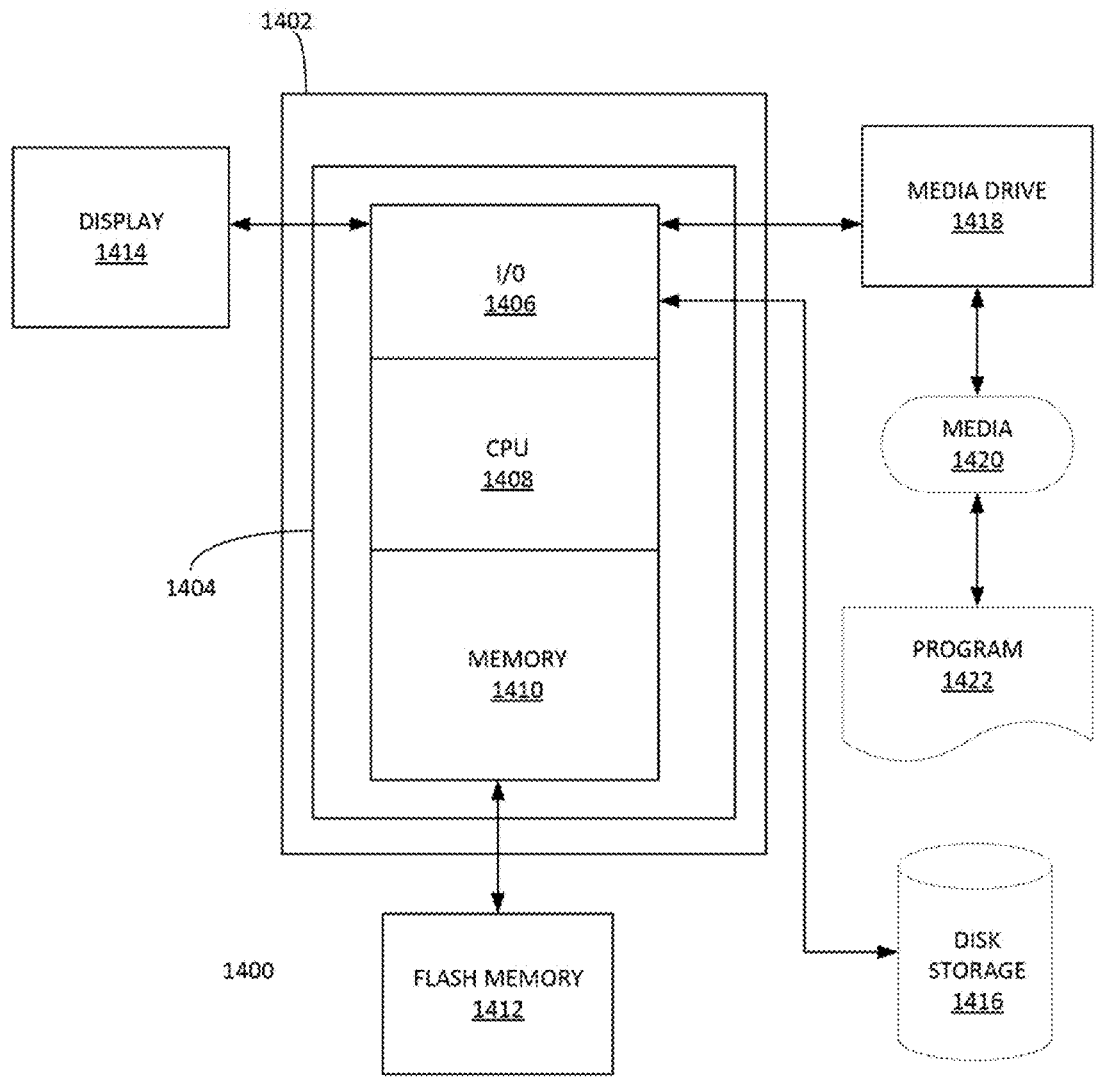
FIG. 14 depicts computing system with a number of components that may be used to perform any of the processes described herein.

FIG. 14 depicts an exemplary computing system 1400 that can be configured to perform any one of the processes provided herein. In this context, computing system 1400 may include, for example, a processor, memory, storage, and I/O devices (e.g. monitor, keyboard, disk drive, Internet connection, etc.). However, computing system 1400 may include circuitry or other specialized hardware for carrying out some or all aspects of the processes. In some operational settings, computing system 1400 may be configured as a system that includes one or more units, each of which is configured to carry out some aspects of the processes either in software, hardware, or some combination thereof.

FIG. 14 depicts computing system 1400 with a number of components that may be used to perform any of the processes described herein. The main system 1402 includes a motherboard 1404 having an I/O section 1406, one or more central processing units (CPU) 1408, and a memory section 1410, which may have a flash memory card 1412 related to it. The I/O section 1406 can be connected to a display 1414, a keyboard and/or other user input (not shown), a disk storage unit 1416, and a media drive unit 1418. The media drive unit 1418 can read/write a computer-readable medium 1420, which can contain programs 1422 and/or data. Computing system 1400 can include a web browser. Moreover, it is noted that computing system 1400 can be configured to include additional systems in order to fulfill various functionalities. Computing system 1400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g. a computer system), and can be performed in any order (e.g. including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A system for securing sensitive data in a cloud storage system comprising:
  an Encrypted Drive System (EDS) automatically linked with cloud storage services associated with a user; and
  a key store located separately from the EDS for storing keys used to encrypt documents, wherein the EDS is configured to:
    encrypt the documents based on file-encryption key associated with the user;
    store the encrypted documents in the cloud storage services associated with the user;
    generate metadata associated with the encrypted documents to enable indexing and search over file names and contents;
    sharing of encrypted documents through email or folder; and
      implement a functional security layer around a set of cloud applications to allow the user to access existing features of linked applications, and wherein the EDS performs the following before encryption to process keyword for search comprising:

parses documents to extract keywords from the documents;
extracts indexable text based on keywords;
generates meta data for the parsed encrypted documents based on keywords;
performs coloring of the encrypted documents to generate color-tags based on an extracted word-set (W), wherein a color-tag comprises a list of text-strings, and wherein list of text-strings are then written into one or more of the metadata fields of the document that are indexed by an underlying cloud service;
generates content summary and stores the content summary in the metadata field;
creates Bloom filters per encrypted document; and
stores the Bloom filters as metadata associated with the documents wherein the Bloom filters used per document records keywords depending upon a frequency with which the keyword appears in a random user query.

2. The system of claim 1, wherein the encryption comprises a cipher based on Advances Encryption Standard (AES) 256.

3. The system of claim 1, wherein said key store used for storing keys of the user is selected by the user from options provided by the EDS.

4. The system of claim 1, wherein said functional security layer enables access to the documents stored in any of the cloud storage services from multiple devices of the user.

5. The system of claim 1, wherein the Bloom filters are serialized and stored along with the color-tags in one metadata field.

6. The system of claim 1, wherein the Bloom filters corresponding to the encrypted documents are stored in a separate key-value datastore in the cloud.

7. The system of claim 1, wherein the color tags generated for a second user may be stored separately in a different indexable datastore or a key-value datastore in the cloud.

8. A method for securing sensitive data in a cloud storage system comprising:
linking the encrypted drive system (EDS) with cloud storage services associated with the user;
providing a keystore located separately from the said EDS;
creating a public-private key pair for user to encrypt and decrypt using RSA algorithm;
securely storing keys as file encryption keys in the key store for the EDS to encrypt and decrypt documents;
storing the encrypted documents in the cloud storage services associated with the user;
wherein the EDS performs the following before encryption to process keyword for search comprising:
parses documents to extract keywords from the documents;
extracts indexable text based on keywords;
generates meta data for the parsed encrypted documents based on keywords;
performs coloring of the encrypted documents to generate color-tags based on an extracted word-set (W), wherein a color-tag comprises a list of text-strings, and wherein list of text-strings are then written into one or more of the metadata fields of the documents that are indexed by an underlying cloud service;
generates content summary and stores the content summary in the metadata field;
creates Bloom filters per encrypted document; and
stores the Bloom filters as metadata associated with the documents wherein the Bloom filters used per document records keywords depending upon a frequency with which the keyword appears in a random user query; and
generating metadata associated with the said encrypted documents to enable indexing, sharing and searching functionality across the encrypted documents; and
stored by the said cloud storage services.

9. A method of claim 8, wherein the metadata enables sharing of the encrypted documents in the cloud storage services with co-workers.

10. A method of claim 9, wherein the sharing comprise steps of:
sharing the encrypted content to a share by creating secure folders with security policy;
encrypting the file encryption keys using owners private key; and
creating a copy of file encryption key by the EDS and encrypting under the sharee's public key and storing the copy of file encryption key in the keystore under the sharee's identifier and shared document identifier.

11. A method of claim 10, wherein the metadata further enables to read and edit the encrypted documents stored in the cloud storage services online.

12. A method of claim 11, wherein the metadata further enables to collaborate with others in real-time to modify the encrypted documents stored in the cloud storage services.

13. A method of claim 12, wherein the security policy is applied to the folders.

14. A method of claim 13, wherein the security policy is further applied to the files in the folders.

15. A method of claim 13, wherein the security policy includes:
restricting downloading; and
restricting printing of the files from the folder and viewing the files only online.

16. A method for full text search over all connected cloud drives by EDS comprise steps of:
obtaining a list of all documents in the connected cloud drive; parsing each document to extract keyword and pattern information;
extracting indexable text based on keywords and pattern information;
performing coloring of the each document to generate color-tags based on an extracted word-set (W) and pattern set (P);
generating content summary and storing the content summary in the metadata field;
creating Bloom filters per document and storing the Bloom filters as metadata;
storing the metadata for indexing and querying by creating the placeholder document within Google Drive for every document in another cloud drive;
sharing documents seamlessly irrespective of backend cloud drive connected to the EDS and
wherein the EDS performs the following before encryption to process keyword for search comprising:
parses documents to extract keywords from the documents;
extracts indexable text based on keywords;
generates meta data for the parsed encrypted documents based on keywords;
performs coloring of the encrypted documents to generate color-tags based on an extracted word-set (W), wherein a color-tag comprises a list of text-strings, and wherein list of text-strings are then written into one or more of the metadata fields of the documents that are indexed by an underlying cloud service;

generates content summary and stores the content summary in the metadata field;

creates Bloom filters per encrypted document; and stores the Bloom filters as metadata associated with the documents wherein the Bloom filters used per document records keywords depending upon a frequency with which the keyword appears in a random user query.

17. A method according to claim 16, wherein the metadata can be further stored by creating a document index in the EDS system server.

* * * * *